J. G. REYNOLDS.
SPRING HINGE.

No. 172,935.                                Patented Feb. 1, 1876.

Witnesses.                                           Inventor.

UNITED STATES PATENT OFFICE.

JOSHUA G. REYNOLDS, OF ELIZABETH, NEW JERSEY.

IMPROVEMENT IN SPRING-HINGES.

Specification forming part of Letters Patent No. 172,935, dated February 1, 1876; application filed October 12, 1875.

CASE B.

*To all whom it may concern:*

Be it known that I, JOSHUA G. REYNOLDS, of the city of Elizabeth, in Union county and State of New Jersey, have invented an Improvement in Spring-Hinges, of which the following is a specification:

My invention consists in a novel device or devices in the application of a spring to a hinge to make it double-acting, as will be hereinafter more fully described and definitely claimed; my object being to produce a neat, strong hinge, that will swing either outward or inward, and that will not sag, as is usually the trouble with double-acting hinges hitherto made.

To accomplish this object I construct the leaves of my hinge in such manner as to enable me to attach the opposite leaves of the hinge to the opposite ends of the coiled spring, so that the swinging of one of the leaves will wind the spring from the inner end, while the swinging of the other leaf will wind the spring from the outer end. The spring is coiled around a sleeve, and the inner end is made fast thereto, the whole being covered by a cylinder, to which is made fast the outer end of the spring. A cap is fitted to one end of the cylinder, and is made fast to one end of the sleeve, to which the spring is attached. The cap is independent of the cylinder, although fitted so as to cover and protect the side of the spring. The spindle which holds the parts together passes through the knuckles of the two leaves, and through the sleeve around which the spring is wound.

There are lips or projections on one or both sides of the cylinder. These lips are for the leaves to rest against to hold them in position, one acting as a brace against the other. The place of said lips may be supplied by suitable pins, but I prefer having the lips cast to the cylinder.

Now, it will be readily understood that if one of the leaves is made to take hold of the cap, and the other to take hold of the cylinder, the swinging of the one will wind the spring from the outside, while the swinging of the other will wind the spring from the inside.

The cylinder is fitted or provided with projections or lips, that rest against the leaves of the hinge, and the cap is provided with a series of holes around its edge, into one of which a pin is inserted to hold the tension of the spring. The several holes are made so that, by changing the pin from one to the other, the tension of the spring may be made stronger, or less strong, as the case may require.

My invention will be more readily understood by reference to the accompanying drawings, which form a part of this specification.

Figure 1:
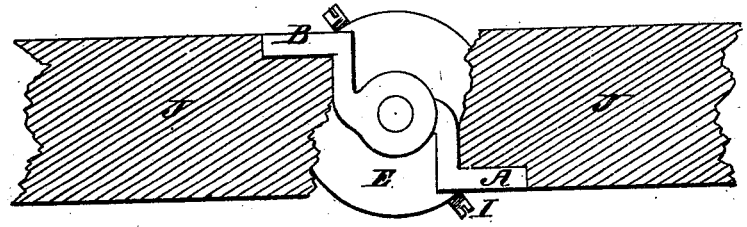
Figure 2:
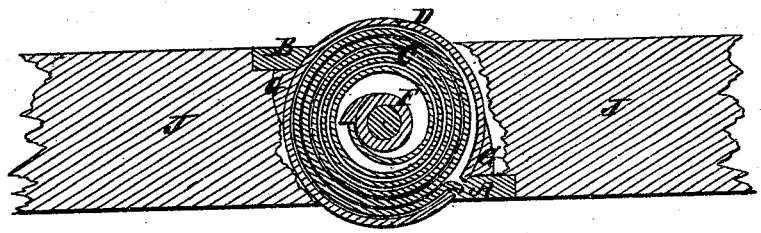
Figure 3:
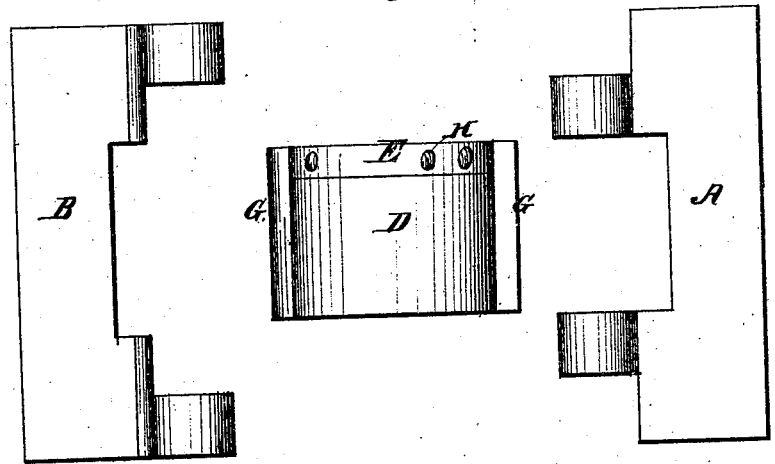

Figure 1 is a plan view of my improved hinge, showing it attached to pieces of wood, to represent the manner of hanging a gate or door. Fig. 2 is a cross-section of the same. Fig. 3 is a view of the parts disconnected.

A is the right leaf, and B is the left leaf, of the hinge. C is the spring. D is the cylinder. E is the cap. F is the sleeve. G and G are the projections or lips on the cylinder against which to rest the leaves of the hinge; H, the series of holes in the cap, and I is the pin for holding the tension of the spring. J and J are the pieces of wood to which the hinge is attached.

Having thus described my invention, what I claim as new, and desire to secure by Letters Patent, is—

The independent cap E, attached to and turning with the sleeve F, and provided with the holes H and pin I, in combination with the cylinder D, having one or more projections or lips, G, substantially as and for the purpose set forth.

J. G. REYNOLDS.

Witnesses:
 H. D. BLAKE,
 WM. B. WINSLOW.